United States Patent [19]

Nespor

[11] Patent Number: 4,672,865
[45] Date of Patent: Jun. 16, 1987

[54] THERMAL WIRE STRIPPER

[76] Inventor: Tony Nespor, 2515 Glencoe Rd., Baltimore, Md. 21234

[21] Appl. No.: 812,327

[22] Filed: Dec. 23, 1985

[51] Int. Cl.⁴ .............................................. H02G 1/12
[52] U.S. Cl. ...................................... 81/9.4; 81/9.51; 219/221
[58] Field of Search ................... 81/9.4, 9.51; 219/221, 219/233, 235; 30/140

[56] References Cited

U.S. PATENT DOCUMENTS

| | | |
|---|---|---|
| 1,632,320 | 6/1927 | Sippel et al. |
| 2,101,913 | 12/1937 | Meyer |
| 2,192,056 | 2/1940 | Watts |
| 2,415,669 | 2/1947 | Beuschel |
| 2,564,126 | 8/1951 | Neece .................................. 219/233 |
| 2,848,914 | 8/1958 | Gottfried |
| 3,038,985 | 6/1962 | Sisk .................................... 219/233 |
| 3,041,439 | 6/1962 | Sisk ................................. 219/221 X |
| 3,080,469 | 3/1963 | Benoit |
| 3,107,287 | 10/1963 | Schechter ............................ 30/140 |
| 3,237,489 | 3/1966 | Trethewey ......................... 219/233 |
| 3,408,478 | 10/1968 | Penn .................................. 219/233 |
| 3,772,127 | 11/1973 | James ................................ 219/233 |
| 4,558,613 | 12/1985 | Nespor ........................... 219/221 X |

FOREIGN PATENT DOCUMENTS 799008  1/1955 United Kingdom .
1117752 10/1984 U.S.S.R. ................................. 81/9.4

Primary Examiner—Roscoe V. Parker
Attorney, Agent, or Firm—John F. McClellan, Sr.

[57] ABSTRACT

An improved thermal wire stripper of the type having a slotted metal thermal strip tensioned between the ends of a pair of upstanding, parallel electrodes, provides a gauge selection rotatable member mounted on one of the electrodes and having successive steps for coacting with successively smaller parallel-jaw portions of the slot to prevent nicking wire in stripping it of insulation. A forked support braces the metal thermal strip against excessive deflection that wire stripping might otherwise cause, a plunger actuated slug-flicker flicks away dangling insulation bits left by stripping operations, and a strip-length gauge and finger shield are also provided.

27 Claims, 7 Drawing Figures

THERMAL WIRE STRIPPER

FIELD OF THE INVENTION

Cross reference is made to my application for U.S. Pat. Ser. No. 624,241 filed 6-25-84 for THERMAL WIRE STRIPPER which will issue as U.S. Pat. No. 4,558,613 on Dec. 17, 1985 and to my application for U.S. Pat. Ser. No. 725,809, filed 4-22-85 for BATTERY POWERED THERMAL WIRE STRIPPER that is co-pending.

This invention relates generally to wire-strippers and particularly to improved electric wire strippers.

BACKGROUND OF THE INVENTION

My above referenced wire strippers comprised each a substantially thin strip of metal stretched between heater terminals arranged to keep it taut and having a tapered slot in it for removing thermoplastic insulation from wire of any size within a range of sizes.

Other known thermal wire strippers include a type having two opposed contours that are heated and caused to move relative to each other to grasp insulation and remove it, as in U.S. Pat. No. 2,192,056 to G. V. Watts, 2-27-40, a similar type with one wire loop, as in U.S. Pat. No. 2,101,913 to E. L. Meyer, 12-14-37; a type having an edge slot as in U.S. Pat. No. 3,080,469 to H. O. J. Benoit, 3-5-63; a keyhole-in-strip type screwdriver handle mounted, unheated stripper in U.S. Pat. No. 2,848,914 to S. Gottfried, 8-26-58; a type having a strip mounted between electrodes as in U.K. Pat. No. 799,008 to Wardray & Company Ltd.; 12-10-58.

SUMMARY OF THE INVENTION

However, no system for the purpose is believed to provide the advantage of this new system in accordance with the objects thereof.

In brief summary given as cursive description only and not as limitation, a principal object of the present invention is to provide a thermal wire stripper that improves over known types including my aforesaid thermal wire strippers by, among other things, the addition of several features:

alternating current powered or direct current powered apparatus, with self-contained batteries, if desired, that will easily strip polyfluethane ("Teflon") insulated wiring;

a wire-size setting or gauge selector use in stripping a plurality of pre-selected sizes of wire;

a protector or element support for prevention of damage to the stripper element;

a mechanism for rapidly ejecting from the stripper insulation removed from wire, the mechanism being called a "slug flicker";

a capacity to strip multistrand wire and shielded wire as well as single strand wire, and further, to strip PVC as well as "Teflon" covered wire easily and cleanly from 10 gauge size up, rapidly, safely and efficiently;

a safety guard for the user;

lightweight, slim construction for comfort and for easy manipulation in tight places;

special protection against nicking wire;

low power consumption;

economical, quick assembly structure and mechanism that is durable, easy to use and fast in operation.

DETAILED DESCRIPTION

Figure 1:
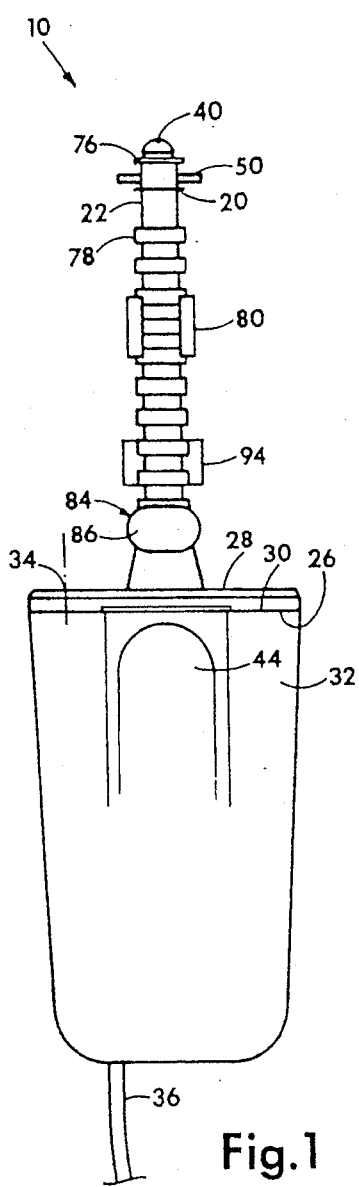
FIG. 1 is a side elevational view of an embodiment of the invention.
Figure 2:
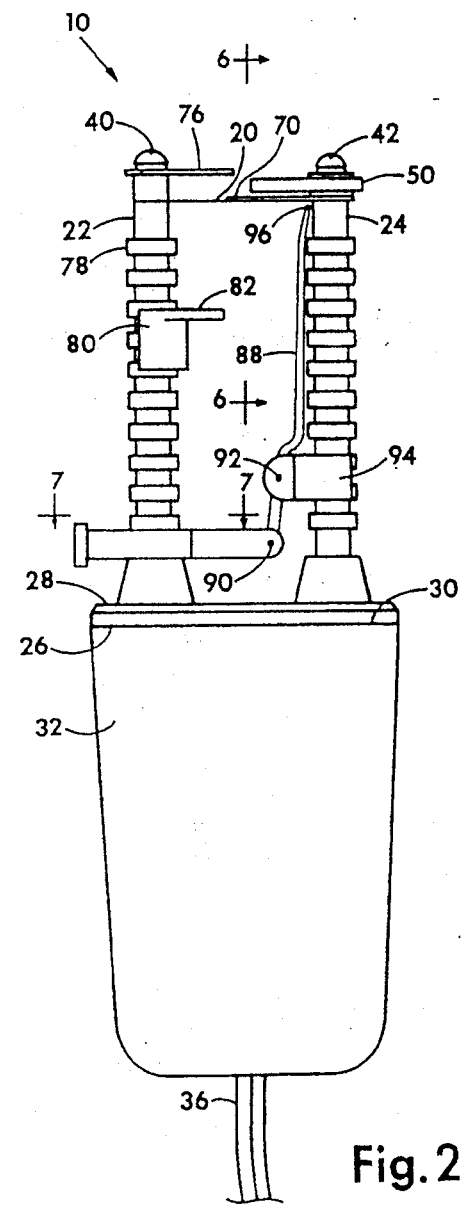
FIG. 2 is a front elevational view thereof.
Figure 3:
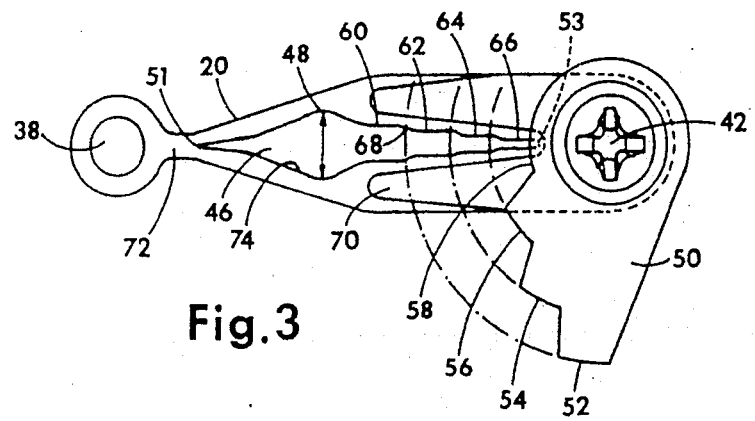
FIG. 3 is a top plan detail on a larger scale, with portions omitted, for exposition, of said embodiment.

FIGS. 1, 2 and 3 show general relations of exterior parts of this invention in embodiment 10.

Metallic strip 20 is stretched between first and second upstanding electrodes 22, 24 by an insulative convex rocker bottom 26 on the cover 28 that mounts the electrodes and is pulled flat against the planar edge 30 of the housing 32 by screws 34. My aforesaid U.S. patent applications Nos. 624,241 which will issue as U.S. Pat. No. 4,558,613 on 12-17-85 and 725,809 describe and show this arrangement and these disclosures of the features are incorporated by reference herein.

Electric leads 36 from the case may go to a battery pack or an A. C. source or batteries may be contained within the case.

The metallic strip 20 has an opening like that shown at 38 at each end for connection to the respective electrodes 22, 24 by respective screws 40, 42 for heating it when an intermittent switch 44 on the housing 32 is depressed by a user. The switch is actually under element 44 which is a flexible portion of the housing, flush with the housing so that when the case is laid on the side, the switch is not accidentally actuated.

For insertion of wire to be stripped, and for stripping it, a longitudinal contoured-slot 46 in metallic strip 20 has sides that taper convergingly from a greatest width 48 at an intermediate portion to narrow rounded ends 51, 53 respectively adjacent the pair of electrodes 22, 24.

As will be described in more detail, wire to be stripped is inserted centrally in the slot and moved toward the heated end of the strip adjacent neck 72 until it encounters the heated end of the strip, and is then rotated relative to the strip and withdrawn, leaving behind the insulation from the portion to be stripped.

In production work particularly, the wire to be stripped must be protected from jamming into position in the tapered portions of the strip 20 because the wire may be nicked. To prevent such, the stripper has a gauge selector 50, rotatable (broken lines) about a center to set the desired step of a plurality of pivot-centered arcuate steps, or convexly radiused peripheral steps 52, 54, 56, 58 for example, in position as a stop across the slot 46 at the terminus of a selected parallel jaw portion 60, 62, 64, 66, or set of successively smaller substantially parallel slot portions. Other gauge sizes may be provided but, for example, the four parallel-jaw portions may efficiently be used for wire in the range of 16, 18, 20 and 22 gauge.

With a strip of suitable construction, wire in the range of 10 to 40 gauge can be provided for according to this principle.

Four parallel steps are optimum because the length of each parallel slot should be at least twice the diameter of the insulation for the particular gauge to be stripped in that slot. This prevents slipping-out of the wire when pulling to strip.

More steps could be provided but the longer the strip the more it can deflect.

Each of the successively narrower parallel jaw portions of the slot has a tapered entrant portion 68.

Because heavier gauges of wire require more pulling force to remove insulation, a "V" shaped strip or element support 70, forked for access and visibility is provided, fixed on the second electrode 24 below the gauge selector 50, between elements 20 and 50 in position for supporting the strip 20 against excessive deflection when wire is pulled. The arms of the support extend about halfway between the electrodes or just past the jaw portion for the coarsest wire to be stripped.

The support 70 may be of stainless steel because the low voltage used for heating the strip will not effectively short through the support 70.

Due to the location and nature of the support and to the tapered, reduced portion of the strip 20, when powered for stripping "Teflon", the strip 20 glows red from the midpoint at 48 to the neck at 72, and is cooler at support 70.

If the user chooses, wire as fine as 24 gauge or finer, can be stripped at the heated end without moving it to a parallel-jaw portion. At the end of the strip adjacent the first electrode 22 where the strip tapers down to a 0.085 inch (2 mm) neck 72, for gauges 22 and coarser, some care is required not to jam and scar the wire, and not to deform the narrow neck, but for 24 and finer gauge wire, stripping forces are low; the wire will bend before it will score.

To prevent stripping of larger gauge wire than suited, the central, maximum opening 48 in the strip 20 is made with a slope on the sides at 74 that is too open to grab the insulation.

As to temperature for "Teflon" insulation, heating the strip to a red glow, about 1800 degrees F., is sufficient. The strip 20 being relatively thin, 0.01 inch ($\frac{1}{4}$ mm) thick, for example, and narrow, heats to operating temperature in about two and one-half seconds.

Although the thermal mass of the strip 20 is low, a finger carelessly touched to it will sustain a burn. To protect against this, a finger shield 76 forked for visibility extends from the top of the first electrode about halfway to the second electrode, supported by the screw 40 in the first electrode.

Center distance between the electrodes may be 1$\frac{1}{4}$ inch (3.1 cm)

The electrodes may have regularly spaced integral ring-flanges 78 therealong for heat dissipation. This feature also helps positive frictional retention of the following:

(1) a stripping-length gauge 80 adjustably positionable by a "C"-shape provisions along the first electrode and protruding toward the second electrode as a shelf 82 for limiting wire length.

(2) a "slug flicker" 84.

When "Teflon" insulated wire is stripped, the insulation portion removed may tend to dangle as a slug, at least temporarily, from the strip 20. To dislodge such, a "slug flicker" is provided in the form of a spring-return reciprocable plunger 86 frictionally mounted on the base of the first electrode in position for pivoting stainless steel arm 88 that is pivoted at 90 to it and at 92 to a snap-on clip 94 above the plunger on the second electrode, and that extends up to a rest position just below the strip 20 at the second electrode. When the plunger is depressed, the upper end 96 sweeps across between the electrodes just below the strip 20 and flicks away any dangling insulation slug. The slug flicker is preferably on the same side as the switch and in position for actuation by the user's thumb also.

The "slug flicker" is optional.

Figure 4:
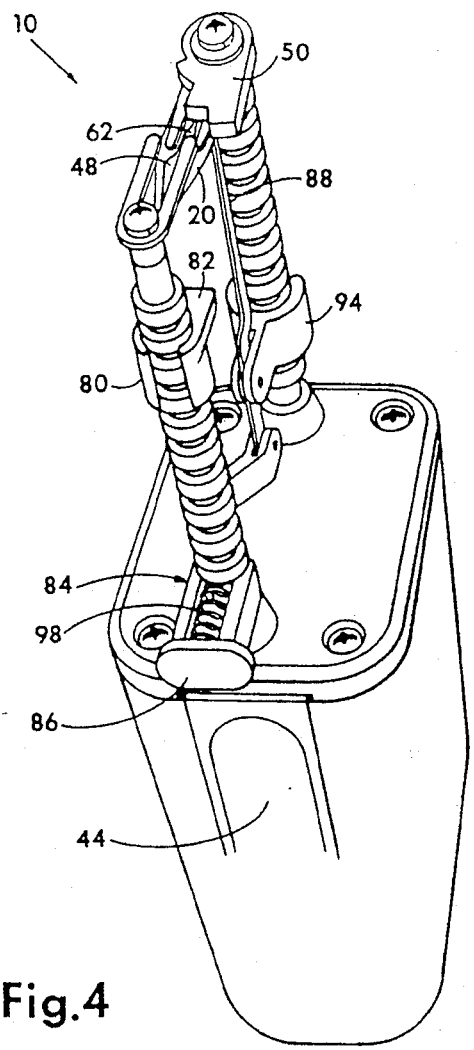
FIG. 4 is a perspective view of the embodiment.

FIG. 4 shows in perspective the general relation of the parts as assembled.

SEQUENCE OF OPERATION TO STRIP INSULATION FROM A LENGTH OF WIRE

1. Set gauge selector 50 to correspond with wire size to be stripped at appropriate parallel jaw portion, 62 for example, of the strip 20.

2. Adjust the stop 82 by sliding the stripping length gauge 80 up or down the first electrode.

3. Insert insulated wire to be stripped into the central part 48 of the slot.

4. Depress switch 44 to heat strip 20 (the primary of the power transformer, or batteries if used, are wired in series with the switch and strip 20).

5. Wedge insulated wire with slight pressure into heated throat until resistance is felt, indicating that insulation has melted all the way to the wire.

6. Rotate tool around axis of wire $\frac{1}{2}$ turn to melt a ring in the insulation (this may be done by rotating the wire to produce the relative rotation, if more convenient). As noted, for gauges 24 and finer, stripping may be done entirely at the throat of the heated end.

7. Release switch 44.

8. Maintain slight side-pressure of wire against one side of the slot (to keep the strip in the melted ring) and slide along the selected slot until resistance is felt as the gauge selector is reached at the selected setting.

9. Maintain slight pressure of the wire against the gauge selector 50 and pull wire free of strip 20 leaving insulation slug behind.

10. Depress plunger 86 of slug flicker 84 and flickoff removed insulation, then release slide, and spring 98 will return the arm 88 to the initial position.

Element 94 holds a pivot for the flicker arm and has a "C"-shaped clasping structure for easy attachment and detachment, as noted, by snapping it on and off the electrode 24.

Figure 5:
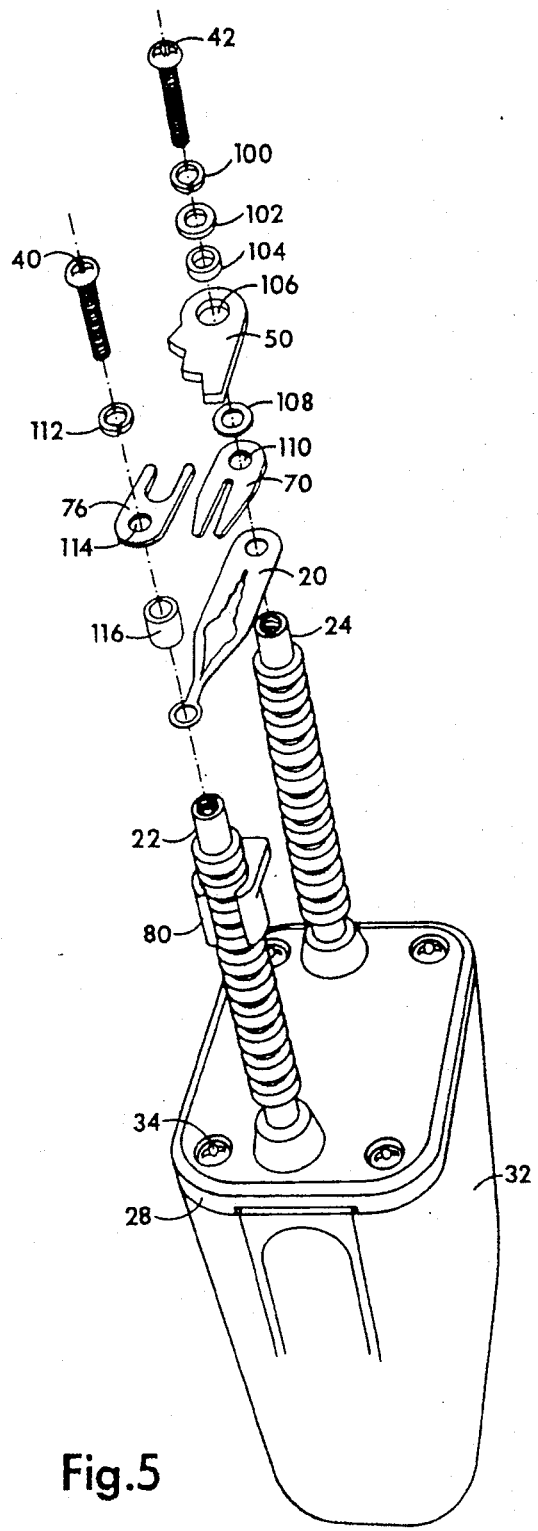
FIG. 5 is a partially exploded view of the embodiment.

FIG. 5 shows some details of construction and the relation of parts in exploded view. The optional slug flicker has been snapped free and removed.

Housing or case 32 may be molded of "Noryl 190", a dimensionally stable temperature-resistant flexible material obtainable from the General Electric Company.

Screws 34 pull the rocker bottom of the cover 28 (that may be of "Noryl 300", that has greater temperature resistance that "Noryl 190") flat against the planar edge structure of the case 32 and maintain tension on thermal strip 20 by forcing the first and second aluminum alloy electrodes 22, 24 angularly apart. The strip 20 is of tempered material, such as "Nichrome" or "Evanohm" material widely used for heating elements. "Nichrome" material is 80% nickel and 20% chromium. "Evanohm" is 75% nickel, 20% chromium, 2$\frac{1}{2}$% copper and 2$\frac{1}{2}$% aluminum. The strip 20 retains hard temper except at the neck portion, when heated. The length gauge 80 is of "Nylon" or other suitable polycarbonate.

Screw 42, by coaction against the top of the second electrode, clamps lockwasher 100, washer 102 and aluminum bushing 104 that fits by finger-press in the hole 106 in the gauge selector 50 but is slightly thicker than the gauge selector, and washer 108 and support 70, forked for access and visibility and with mounting hole 110, and strip 20. Gauge selector 50 may be of "Noryl 300" or any suitable high temperature plastic.

Screw 40 clamps, by coaction against the top of the first electrode, lock washer 112, shield or guard 76 forked for access and visibility and with mounting hole 114, and aluminum spacer 116 and thermal strip 20 at the smaller end.

Figure 6:
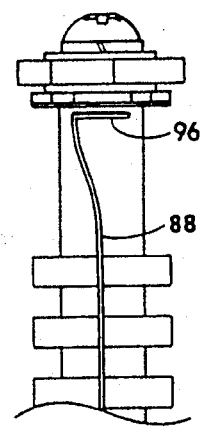
FIG. 6 is a fragmentary detail on a larger scale, taken at 6—6, FIG. 2.

FIG. 6 shows the relation of the preferably "L"-shaped top or flicking portion 96 of the slug flicker arm 88.

Figure 7:
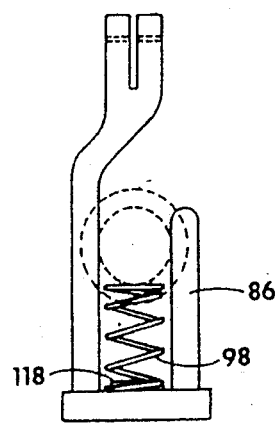
FIG. 7 is a plan view detail on a larger scale, adapted from 7—7, FIG. 2.

FIG. 7 shows how the "Nylon" plunger 86 and return spring 98 of the slug flicker are retained. The plunger rides on the smaller diameter portion of the electrode (22) between larger diameter portions, shown in broken lines for exposition, with the spring 98 retained against the electrode and by an integral button 118 on the interior of the plunger press-fitted in the spring.

Snap clearance permits the flexible clip arms of the slug flicker to be snapped free of the electrodes and as easily re-attached.

This instrument embodied for use in stripping "Teflon" insulation has a power consumption of about 50 watts intermittent (30 amps. at 1.3 V under load). A five second "on" time is recommended as a maximum. The strip cools quickly when turned off. Alternating current is preferably but re-chargeable "NiCad" batteries may be used, particularly in the field.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States letters patent is:

1. In a wire stripper of the type having a pair of upstanding electrodes with a metal strip stretched between them and electrically connected for heating by them, the metal strip having structure defining a longitudinal slot with converging sides for engaging and melting insulation on a length of wire inserted into the slot, enabling the wire to be pulled away free of insulation on said length, the improvement comprising: means for preventing nicking of wire by said converging sides including said converging sides defining a plurality of sets of successively smaller substantially parallel slot portions with respective spacings corresponding to wire gauges, and a member with adjustable provision for limiting passage along said sets of successively smaller substantially parallel slot portions of wire of a size larger across than a selected said set.

2. In a wire stripper as recited in claim 1, the adjustable provision comprising said member being rotatable about a center and having a periphery variable about the center of rotation.

3. In a wire stripper as recited in claim 1, the adjustable provision comprising said member being movable and having a stepped portion for extending along said thermal strip varying distance corresponding to said movement.

4. In a wire stripper as recited in claim 3, said member being rotatable and said stepped portion being along a peripheral portion thereof.

5. In a wire stripper as recited in claim 4, said member rotation being about an electrode.

6. In a wire stripper as recited in claim 1, a support attached to one of said electrodes and extending over a portion of said thermal strip.

7. In a wire stripper as recited in claim 6, the support being forked in position for providing access to said slot.

8. In a wire stripper as recited in claim 6, the support being above the thermal strip and below said member.

9. In a wire stripper as recited in claim 1, a snap-on-attachment member with a "C"-shaped portion proportioned for fitting a said electrode and a shelf-like portion protruding laterally therefrom below the thermal strip for gauging wire length to be stripped.

10. In a wire stripper as recited in claim 1, a slug flicker for flicking slugs of removed insulation from beneath said thermal strip 11. In a wire stripper as recited in claim 10, said slug flicker including a plunger, pivotal means, and an arm attached to said plunger and pivotal means and extending upwardly to a position adjacently beneath said thermal strip.

12. In a wire stripper as recited in claim 11, said arm having a "L"-shaped upper end.

13. In a wire stripper as recited in claim 12, said slug flicker having "C"-shaped snap-on structure for attachment to said electrode.

14. In a wire stripper as recited in claim 13, a said electrode having two-diameter structure and said slug flicker having a plunger for actuation of the slug flicker, and said plunger having support including engagement with said two-diameter structure.

15. In a wire stripper as recited in claim 14, the wire stripper being of the type having a housing and a switch portion integral with the housing in position for actuation by a user's thumb, and the plunger of the slug flicker being located adjacent the switch portion for convenient actuation by a said thumb.

16. In a wire stripper as recited in claim 15, said switch portion being flush with the housing.

17. In a wire stripper as recited in claim 1, a finger shield above a portion of said thermal strip.

18. In a wire stripper as recited in claim 17, said finger shield having forked structure for providing access to the thermal strip.

19. In a wire-insulation stripper of the type having a case, a strip to be heated, a pair of electrodes extending from the case and having connection for heating the strip and a longitudinally tapered slot with a larger part and a smaller part for stripping a portion of the insulation of a wire as a slug, the improvement comprising: a slug flicker, including means movably attached to a first of said pair of electrodes for actuating a portion of the slug flicker along said strip longitudinally of said slot from the smaller part to the larger part and flicking away said slug, and said portion of the slug flicker to be actuated being movably attached to the second of said pair of electrodes.

20. In a wire-insulation stripper as recited in claim 19, the slug flicker being between the pair of electrodes, said means for actuating a portion of said slug flicker extending beyond one of said pair of electrodes for actuation by a user, and the movable attachment to the first electrode and to the second electrode including "C"-shaped snap-on snap-off attachment.

21. In a wire-insulation stripper of the type having a strip, a case, first and second electrodes extending from the case and connecting to respective first and second ends of the strip for heating the strip, the strip having structure defining a slot in the strip with a portion adjacent the first electrode and extending to a portion adjacent the second electrode, the slot proportioned for removing wire-insulation from insulated wire engaged with the slot defining structure upon application of force to the insulated wire, the improvement comprising: means for causing said first end of the strip to heat to a greater degree than the second end of the strip, including an element extending from the second electrode in position for supporting the second end of the strip against said force.

22. In a wire-insulation as recited in claim 21, said element having a forked shape.

23. In a wire stripper of the type having a pair of upstanding electrodes with a metal strip stretched between them and electrically connected for heating by them, the metal strip having structure defining a longitudinal slot with converging sides for engaging and melting insulation on a length of wire inserted into the longitudinal slot, enabling the wire to be pulled away free of insulation on said length, the improvement comprising: a slug flicker for flicking slugs of removed insulation dangling from beneath said thermal strip, said slug flicker including a manually actuatable plunger for actuating said slug flicker, pivotal means, and an arm attached to said plunger and pivotal means and extending upwardly to a position adjacently beneath said thermal strip for moving along said thermal strip in flicking said slugs when actuated by the plunger.

24. In a wire stripper as recited in claim 23, said arm having an "L"-shaped slug-flicking upper end extending transverse to said longitudinal slot.

25. In a wire stripper as recited in claim 23, said slug flicker having "C"-shaped snap-on structure for attachment to said electrode.

26. In a wire stripper as recited in claim 23, a said electrode having two-diameter structure and said slug flicker plunger having support including engagement with said two-diameter structure.

27. In a wire stripper as recited in claim 25, the wire stripper being of the type having a housing and a switch portion integral with the housing in position for actuation by a user's thumb, and the plunger of the slug flicker being located adjacent the switch portion for convenient actuation by a said thumb.

* * * * *